United States Patent
Fan et al.

(10) Patent No.: US 8,301,584 B2
(45) Date of Patent: Oct. 30, 2012

(54) SYSTEM AND METHOD FOR ADAPTIVE PRUNING

(75) Inventors: Wei Fan, New York, NY (US); Haixun Wang, Tarrytown, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2678 days.

(21) Appl. No.: 10/737,123

(22) Filed: Dec. 16, 2003

(65) Prior Publication Data
US 2005/0131873 A1    Jun. 16, 2005

(51) Int. Cl.
*G06F 7/00*   (2006.01)
*G06F 3/00*   (2006.01)
(52) U.S. Cl. .......... 707/603; 707/999.002; 707/999.005; 706/20; 706/21
(58) Field of Classification Search .............. 707/1–10, 707/100–102, 104.1, 200–201, 603, 999.002; 706/20, 21
See application file for complete search history.

(56) References Cited

U.S. PATENT DOCUMENTS

| | | | | |
|---|---|---|---|---|
| 6,192,353 B1 * | 2/2001 | Assaleh et al. | | 706/20 |
| 6,401,057 B1 * | 6/2002 | Kadtke et al. | | 702/189 |
| 6,513,025 B1 * | 1/2003 | Rosen | | 706/45 |
| 6,865,582 B2 * | 3/2005 | Obradovic et al. | | 707/104.1 |
| 6,912,527 B2 * | 6/2005 | Shimano et al. | | 707/7 |
| 6,915,306 B1 * | 7/2005 | Gong et al. | | 707/102 |
| 6,931,403 B1 * | 8/2005 | Agrawal et al. | | 707/10 |
| 6,937,994 B1 * | 8/2005 | Iyengar | | 705/7.29 |
| 6,976,207 B1 * | 12/2005 | Rujan et al. | | 715/500 |
| 7,020,593 B2 * | 3/2006 | Hong et al. | | 703/2 |
| 2003/0212679 A1 * | 11/2003 | Venkayala et al. | | 707/6 |
| 2004/0111419 A1 * | 6/2004 | Cook et al. | | 707/100 |
| 2004/0117367 A1 * | 6/2004 | Smith et al. | | 707/5 |
| 2005/0100209 A1 * | 5/2005 | Lewis et al. | | 382/159 |

* cited by examiner

*Primary Examiner* — Miranda Le
(74) *Attorney, Agent, or Firm* — Gibb & Riley, LLC

(57) ABSTRACT

Disclosed in a method and structure for searching data in databases using an ensemble of models. First the invention performs training. This training orders models within the ensemble in order of prediction accuracy and joins different numbers of models together to form sub-ensembles. The models are joined together in the sub-ensemble in the order of prediction accuracy. Next in the training process, the invention calculates confidence values of each of the sub-ensembles. The confidence is a measure of how closely results form the sub-ensemble will match results from the ensemble. The size of each of the sub-ensembles is variable depending upon the level of confidence, while, to the contrary, the size of the ensemble is fixed. After the training, the invention can make a prediction. First, the invention selects a sub-ensemble that meets a given level of confidence. As the level of confidence is raised, a sub-ensemble that has more models will be selected and as the level of confidence is lowered, a sub-ensemble that has fewer models will be selected. Finally, the invention applies the selected sub-ensemble, in place of the ensemble, to an example to make a prediction.

20 Claims, 4 Drawing Sheets

SYSTEM AND METHOD FOR ADAPTIVE PRUNING

BACKGROUND OF THE INVENTION

1. Field of the Invention

The present invention generally relates to searching data using ensembles of models, and more particularly to the use of sub-ensembles that include a smaller number of models than the ensemble and that include only the most accurate models to increase throughput without sacrificing accuracy.

2. Description of the Related Art

In the past few years, multiple models or ensembles has been extensively studied in data mining to scale up or speed up learning a single model from a very large dataset. There are various forms of ensembles that have been proposed. However, multiple models have one intrinsic problem, i.e., inefficiency in classification. In order to make a prediction on an example, conventionally every model in the ensemble needs to be consulted. This significantly reduces prediction throughput. The invention described below addresses these needs.

SUMMARY OF THE INVENTION

The invention provides a method of searching data in databases using an ensemble of models. First the invention performs training. This training orders models within the ensemble in order of prediction accuracy, with the most accurate model being first, and joins different numbers of models together to form sub-ensembles. The models are joined together in the sub-ensemble in the order of prediction accuracy. Therefore, the sub-ensembles include fewer models that the ensemble and each sub-ensemble includes only the most accurate models. Next in the training process, the invention calculates confidence values of each of the sub-ensembles. The confidence is a measure of how closely results from the sub-ensemble will match results from the ensemble. The size of each of the sub-ensembles is variable depending upon the level of confidence, while, to the contrary, the size of the ensemble is fixed.

After the training, the invention can make a prediction. First, the invention selects a sub-ensemble that meets a given level of confidence. As the level of confidence is raised, a sub-ensemble that has more models will be selected and as the level of confidence is lowered, a sub-ensemble that has fewer models will be selected. Finally, the invention applies the selected sub-ensemble, in place of the ensemble, to an example to make a prediction.

This invention reduces the expected dynamic "size" of the ensembles in order to increase system throughput. Not all the classifiers in the ensemble are needed all the time for every example. Some examples are "easier" to predict than others. Therefore, the invention provides an adaptive method that measures the confidence of a prediction by a subset of classifiers (models) in the original ensemble and decides if more classifiers in the ensemble need to be employed to generate a prediction that is approximately the same as the original unpruned ensemble. With the invention, the average or "expected" number of classifiers is reduced by 25% to 75% without loss of accuracy. The areas of applications that benefit from this invention include fraud detection, risk management, trading surveillances, medical diagnosis, intrusion detection, as well as security and exchange.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
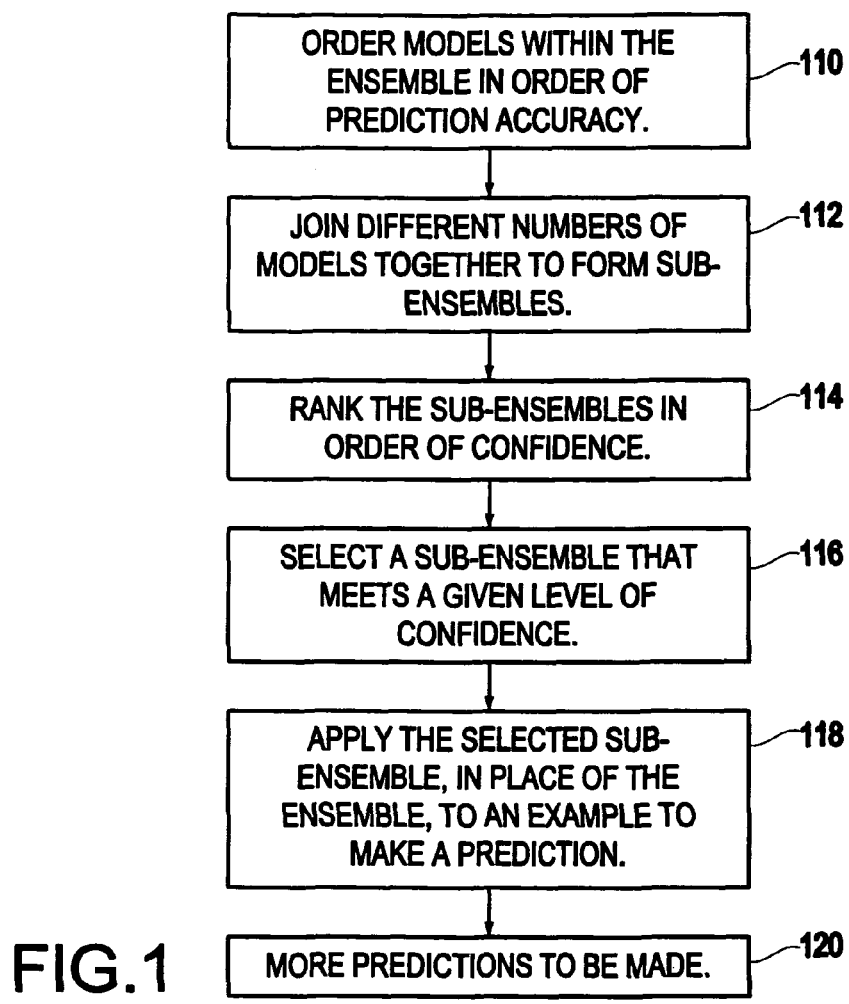
FIG. 1 is a flow diagram illustrating a preferred method of the invention.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

The use of multiple models (ensembles) can scale up data mining over very large databases and datasets. Ensembles of models (classifiers) achieve the same or even better accuracy than a single model computed from the entire dataset. However, one major drawback of ensembles is the inefficiency of the ensemble in prediction, since every base model in the ensemble has to be consulted in order to produce a prediction. This invention provides an adaptive pruning approach to reduce the "expected" number of classifiers employed in prediction. The invention is applicable to a wide range of ensembles. It measures the confidence of a prediction by a subset of classifiers in the ensemble. Thus, confidence is used to decide if more classifiers are needed in order to produce a prediction that is the same as the original ensemble with more classifiers. Empirical studies have found that this approach reduces the "expected" number of classifiers by 25% to 75% without loss of accuracy.

As show in the flowchart in FIG. 1, the invention first performs training (110, 112, 114). This training orders models within the ensemble in order of prediction accuracy 110 with the most accurate model being first in the order and joins different numbers of models together to form sub-ensembles 112. This "means for ordering" can be performed using a central processing unit of a computer and can be embodied in a computer program, as discussed below with respect to FIG. 6. The models are joined together in the sub-ensemble in the order of prediction accuracy. Thus, the first sub-ensemble will include only the most accurate model, the second sub-ensemble will include both the first and second most accurate models, the next sub-ensemble will include the top three models, and so forth. Each subsequent sub-ensemble includes the next most accurate model and the very last sub-ensemble includes all models except the least accurate model. The prediction accuracy for each model is calculated by checking predictions made with each model separately using validation data (or training data that was initially used to train the model, if insufficient validation data is unavailable).

Therefore, the sub-ensembles include fewer models than the ensemble and each sub-ensemble includes only a limited number of the most accurate models. Next in the training process, the invention calculates confidence values of each of the sub-ensembles and thereby ranks the sub-ensembles in order of confidence 114. The confidence is a measure of how closely results from the sub-ensemble will match results from the ensemble. Thus, a 90% confidence level indicates that the sub-ensemble has a 90% chance of returning the same prediction as the original ensemble. The confidence for each sub-ensemble is calculated by checking predictions made with each sub-ensemble separately, again using validation data (or training data). Thus, the size of each of the sub-ensembles is different and has a potentially different level of confidence, while, to the contrary, the size of the ensemble is fixed.

After the training, the invention can make predictions (116, 118, 120) with higher throughput than with the original ensemble. First, the invention selects a sub-ensemble that meets a given level of confidence 116. This level of confidence is supplied by the user through, for example, a graphic user interface or computerized network connection (as discussed below with respect to FIG. 6) and comprises a "means for selecting" a sub-ensemble. As the level of confidence is raised, a sub-ensemble that has more models will be selected and as the level of confidence is lowered, a sub-ensemble that has fewer models will be selected. The invention applies the selected sub-ensemble, in place of the ensemble, to an example to make a prediction 118. This "means for applying" the sub-ensemble to produce a prediction can again comprise the central processing unit of the computer system shown in FIG. 6. As shown by decision box 120, if there are more predictions to be made, processing loops back to item 116 to potentially select a new sub-ensemble (if the level of confidence is changed) before making the prediction 118.

Figure 2:
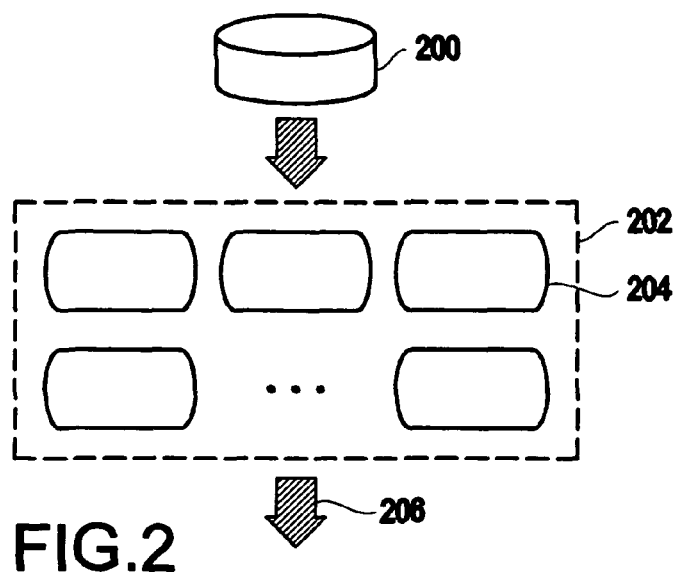
FIG. 2 is a schematic diagram showing the use of an ensemble.
Figure 3:
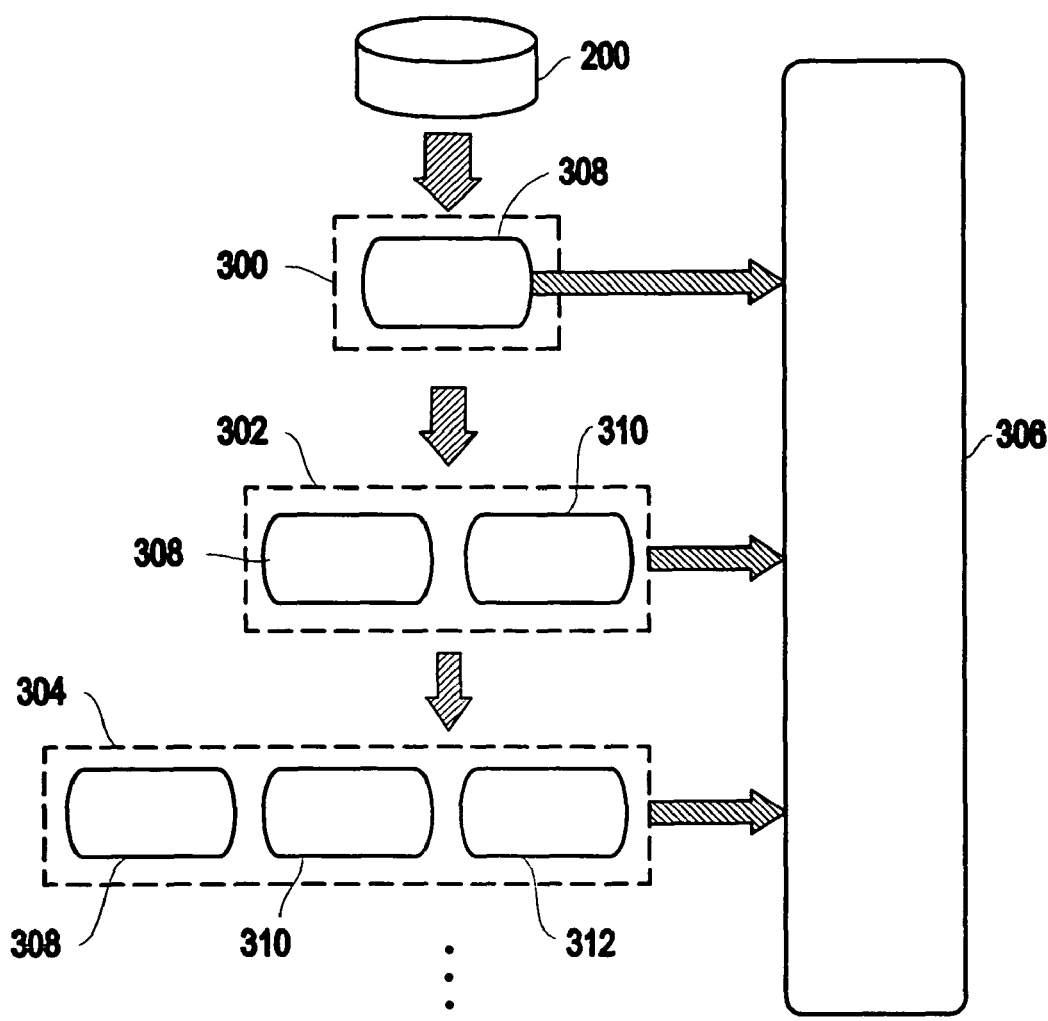
FIG. 3 is a schematic diagram showing the use of sub-ensembles.

FIGS. 2 and 3 illustrate the operation of the invention graphically. More specifically, FIG. 2 illustrates the data set for database 200 and the original ensemble 202 of models 204 used to make a prediction 206. FIG. 3 illustrates sub-ensembles 300, 302, 304. Sub-ensemble 300 includes only the most accurate model 308. Sub-ensemble 302 includes the most accurate model 308 and the next most accurate model 310. Sub-ensemble 304 includes the most accurate model 308, the next most accurate model 310, and the third most accurate model 312. As mentioned above, subsequent sub-ensembles will include the next most accurate models in order of accuracy. The invention selects between the ensembles 300, 302, 304 depending upon the level of confidence required. The invention will utilize the selected one of the sub-ensembles 300, 302, 304 to make the prediction 306.

The invention does not need to use every classifier in the original ensemble to provide accurate predictions. For example, if the probability estimate using a sub-ensemble of only 2 classifiers is 0.6, and the probability estimate by the original ensemble with, for example, 256 classifiers is 0.6, the sub-ensemble will make exactly the same prediction as the original ensemble. Actually, probability estimates by the conjectured 2 classifiers and 256 classifiers need not be the same in order to make the same predictions. If T(X)=0.1 is the decision threshold to predict x to be positive, P(X)=0.2 and P(X)=0.4 will produce the same prediction. The exact value of T(X) depends x and the application.

For a given ensemble with k number of base models, the invention first orders the base classifiers into a "pipeline" according to their accuracy. Assume that the pipeline is $C_1 \square \ldots \square C_k$. To classify x, the classifier with the highest accuracy in the pipeline ($C_1$ in this case) will always be consulted first, followed by classifiers with decreasing accuracy, i.e., from $C_2$ to $C_k$. This pipeline procedure stops as soon as "a confident prediction" is made or there are no more classifiers in the pipeline.

The following provides details on what is a confidence prediction and how to compute the confidence. Assume that $C_1, \ldots, C_k$ is the ordered classifiers. The set of classifiers at pipeline stage i is $\{C_1, \ldots, C_i\}$. Since the target is to reach the accuracy level of the original ensemble with complete k classifiers, the confidence is calculated based on errors of the current probability estimate at stage i to the probability estimate $P_S(X)$ by the original ensemble.

At pipeline stage i, assume that the probability for x is $P_{S'_i}(x)$. The error is simply $\epsilon_i(X) = P_{S'_i}(X) - P_S(X)$ In order to compute confidence, the invention first divides the range of probability ($P_{S'_i}(X) \in [0,1]$) into several bins or buckets (such as 0-0.1, 0.1-0.2, etc.) and confidence is computed from examples in the same bin. The invention uses $b(P_{S'_i}(X))$, or $\hat{b}_i(X)$ as a short form, to map $P_{S'_i}(X)$ to the bin it belongs to.

The invention then calculates the average $\mu_i(\hat{b}_i(X))$ and variance $\sigma_i^2(\hat{b}_i(X))$ of error $\epsilon_i(X)$ for examples in the same bin $\hat{b}_i(X)$. These statistics measure the difference between $P_{S'_i}(X)$ and $P_S(X)$.

To classify an unknown instance x, when $P_{S'_i}(X)$ is computed by the first i classifiers in the pipeline, the invention first determine the group it belongs to, $\hat{b}_i(X)$, then applies the following decision rules.

$$\begin{cases} (P_{S'_i}(x) - \mu_i(\hat{b}(x)) - t \cdot \sigma_i(\hat{b}_i(x))) \rangle T(x), \text{ positive} \\ (P_{S'_i}(x) - \mu_i(\hat{b}_i(x)) + t \cdot \sigma_i(\hat{b}_i(x))) \leq T(x), \text{ negative} \\ \text{otherwise,} \end{cases}$$

Figure 4:
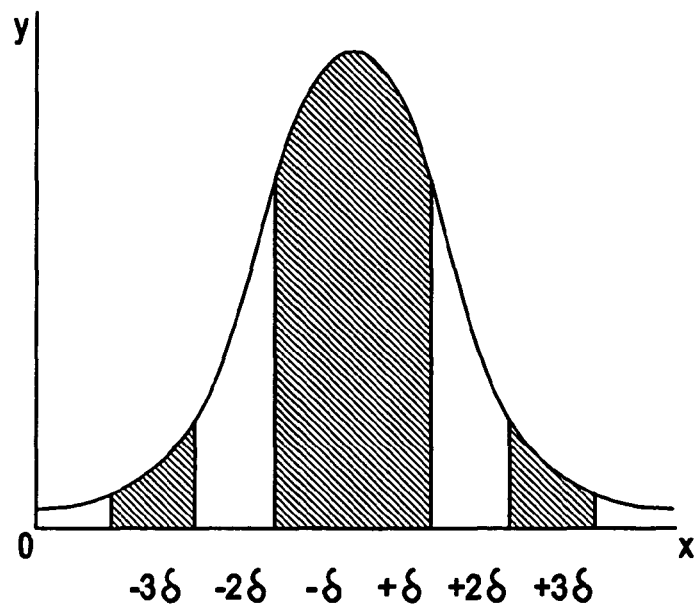
FIG. 4 illustrates the use of a Gaussian distribution to compute this confidence interval.

In the above, the variable "t" is a confidence interval parameter. Assuming normal distribution, t=3 has 99.7% confidence. FIG. 4 illustrates the use of a Gaussian distribution to compute this confidence interval. When t=3, the confidence is the area between (−3delta, 3delta). When the prediction is uncertain, the next classifier in the pipeline ($C_{i-1}$) is employed. If there are no more classifiers, the current prediction is returned. Thus, not all examples use all classifiers in the pipeline to compute a confident prediction, and the "expected" number of classifiers can be reduced.

The inventive adaptive pruning of the classifiers updates probabilities and group examples at each pipeline stage. The cost to compute confidence mainly comes from updating estimated probabilities for all n examples; the complexity to train an adaptively pruned ensemble is therefore O(k·n). During classification, the invention maps probabilities to confidence using a hash table. Decision trees output limited number of unique estimated probabilities since there are a limited number of nodes. Besides binning, a more fine-grained approach is to group examples with the same value of $P_{S'_i}(x)$. However, some $P_{S'_i}(x)$ values computed at classification may not be seen at training time, because some particular combination of leaf nodes from different trees are not encountered on training data. If this happens, the pipeline runs to the end.

Figure 5:
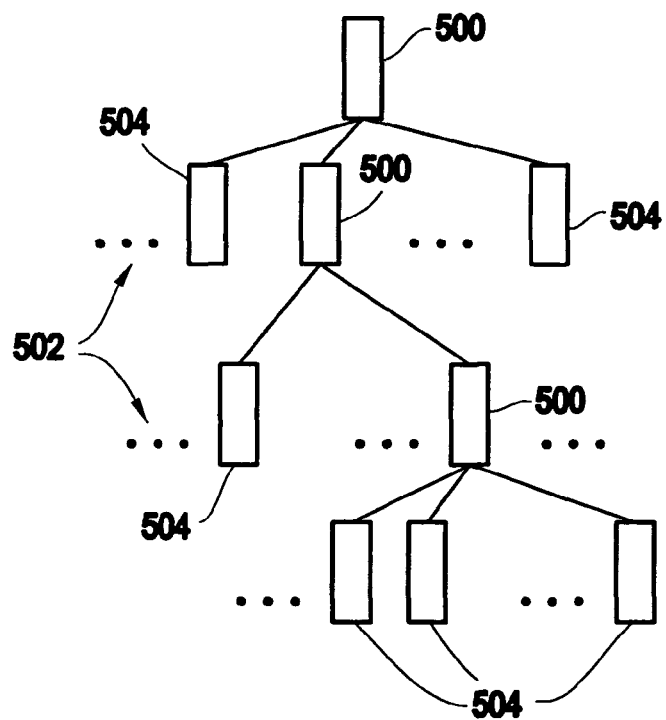
FIG. 5 is a schematic diagram of a decision tree.

FIG. 5 illustrates a decision tree of a group identifier. More specifically, FIG. 5 illustrates a particular example of a decision tree classifier. A decision tree has both non-leaf nodes 500 and leaf nodes. Items 502 and 504 represent subsets of examples. A non-leaf node such as (500) is a "feature test", for example, someone's educational background, which could be engineering, law, education, arts, literature, and etc. Each non-leaf node will split the data into multiple disjoint paths depending on the rest of the feature test. An example with an education background of engineering could go to a different classification path than one with an art background. A decision tree classifies an example using a path of feature tests until it cannot have more features to test. At this point, it reaches a leaf node where a prediction is always made. Multiple examples are classified by the same decision path and end up in the same leaf node. At the leaf node, the decision tree will predict the final outcome. If in the training data, there are 50 donors and 5 non-donors in a leaf, the probability that someone is a donor is P(donor|x)=50/(50+5)=0.91. In an ensemble, multiple classifiers like the afore discussed decision tree is constructed and each one is able to make a prediction.

Figure 6:
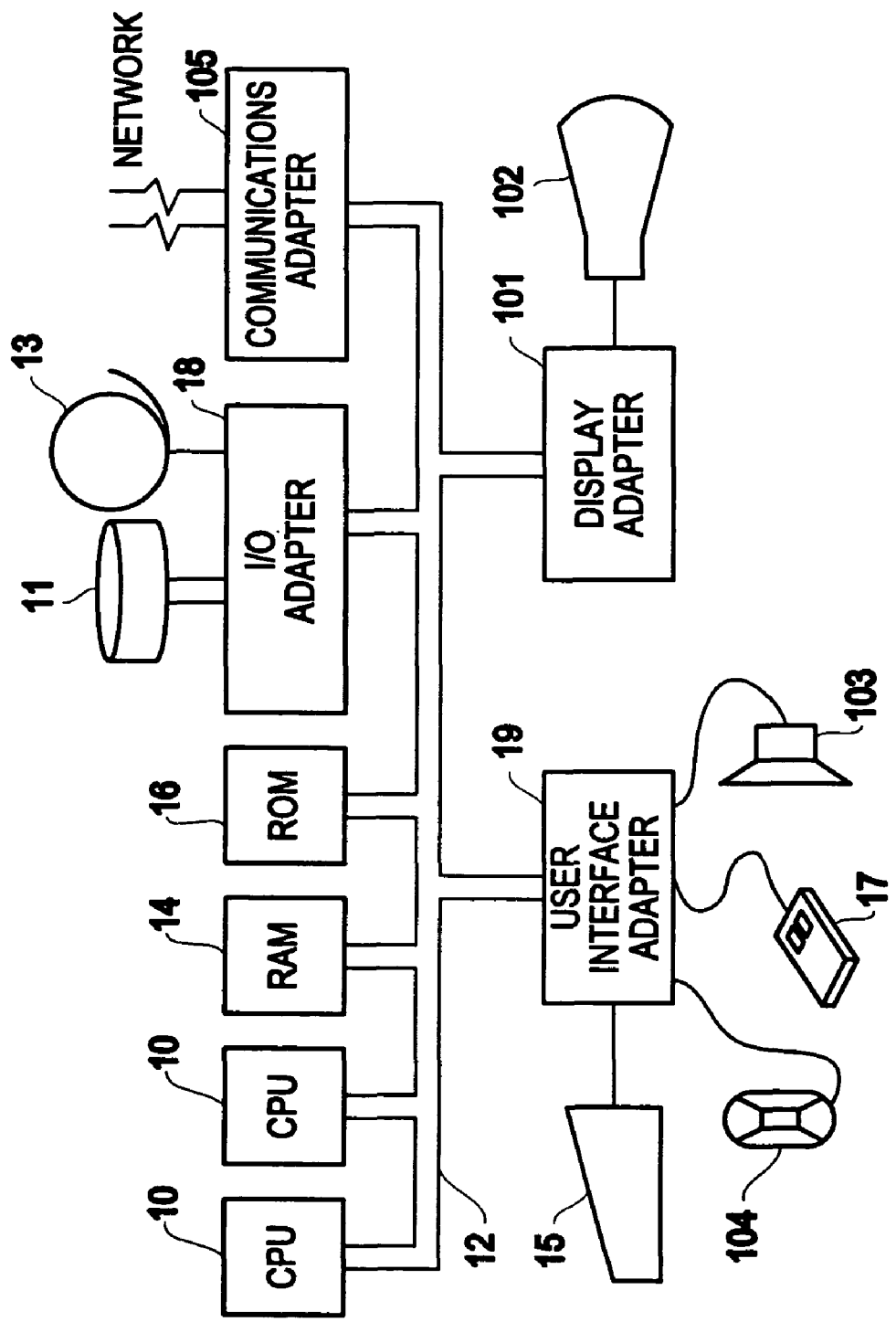
FIG. 6 is a hardware embodiment of the invention.

A representative hardware environment for practicing the present invention is depicted in FIG. 6, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate the invention also loaded onto the computer system.

Thus, as shown above, the invention reduces the expected dynamic "size" of the ensembles in order to increase system throughput. Not all the classifiers in the ensemble are needed all the time for every example. Some examples are "easier" to predict than others. Therefore, the invention provides an adaptive method that measures the confidence of a prediction by a subset of classifiers (models) in the original ensemble and decides if more classifiers in the ensemble need to be employed to generate a prediction that is approximately the same as the original unpruned ensemble. With the invention, the average or "expected" number of classifiers is reduced by 25% to 75% without loss of accuracy. The areas of applications that benefit from this invention include fraud detection, risk management, trading surveillances, medical diagnosis, intrusion detection, as well as security and exchange.

Another benefit from this invention is a significant increase in throughput of prediction by at least 200% to 400%. If the prediction time a conventional ensembles takes is 1 second, the invention will take about 0.25 second. Thus, with the invention, the same amount of hardware can process twice to four times as much data. Such a significant increase in throughput will scale up applications such as homeland security, stock trading surveillance, fraud detection, aerial space images, among others where the volume of data is very large.

While the invention has been described in terms of preferred embodiments, those skilled in the art will recognize that the invention can be practiced with modification within the spirit and scope of the appended claims.

The invention claimed is:

1. A method of searching data in databases using an ensemble of models, said method comprising:
    ordering models within said ensemble in order of prediction accuracy, with the most accurate model being first in said order, using a computer;
    calculating confidence values of each of said sub-ensembles, using said computer;
    selecting a sub-ensemble of said models that meets a given level of confidence, using said computer, wherein models are joined together in said sub-ensemble in said order of prediction accuracy, and wherein as the level of confidence is raised, a sub-ensemble that has more models will be selected in said selecting process, and as the level of confidence is lowered, a sub-ensemble that has fewer models will be selected in said selecting process; and
    applying said sub-ensemble, in place of said ensemble, to an example to make a prediction, using said computer.

2. The method in claim 1, wherein said sub-ensemble includes fewer models than said ensemble.

3. The method in claim 1, wherein said confidence is a measure of how closely results from said sub-ensemble will match results from said ensemble.

4. The method in claim 1, wherein, the size of each sub-ensemble is different and has a potentially different level of confidence.

5. The method in claim 1, wherein the size of said ensemble is fixed.

6. A method of searching data in databases using an ensemble of models, said method comprising:
    ordering models within said ensemble in order of prediction accuracy, with the most accurate model being first in said order, using a computer;
    calculating confidence values of each of said sub-ensembles, using said computer;
    selecting a sub-ensemble of said models that meets a given level of confidence, wherein models are joined together in said sub-ensemble in said order of prediction accuracy, such that said sub-ensemble include only the most accurate models, and wherein as the level of confidence is raised, a sub-ensemble that has more models will be selected in said selecting process, and as the level of confidence is lowered, a sub-ensemble that has fewer models will be selected in said selecting process; and
    applying said sub-ensemble, in place of said ensemble, to an example to make a prediction, using said computer.

7. The method in claim 6, wherein said sub-ensemble includes fewer models than said ensemble.

8. The method in claim 6, wherein said confidence is a measure of how closely results from said sub-ensemble will match results from said ensemble.

9. The method in claim 6, wherein the size of each sub-ensemble is different and has a potentially different level of confidence.

10. The method in claim 6, wherein the size of said ensemble is fixed.

11. A method of searching data in databases using an ensemble of models, said method comprising:
    performing training comprising:
        ordering models within said ensemble in order of prediction accuracy, with the most accurate model being first in said order, using a computer;

joining different numbers of models together to form sub-ensembles, wherein models are joined together in said sub-ensemble in said order of prediction accuracy, using said computer;

calculating confidence values of each of said sub-ensembles; and making a prediction comprising:

selecting a sub-ensemble of said models that meets a given level of confidence, using said computer, wherein as the level of confidence is raised, a sub-ensemble that has more models will be selected in said selecting process, and as the level of confidence is lowered, a sub-ensemble that has fewer models will be selected in said selecting process; and applying said sub-ensemble, in place of said ensemble, to an example to make a prediction, using said computer.

12. The method in claim 11, wherein said sub-ensemble includes fewer models than said ensemble.

13. The method in claim 11, wherein said confidence is a measure of how closely results from said sub-ensemble will match results from said ensemble.

14. The method in claim 11, wherein the size of each sub-ensemble is different and has a potentially different level of confidence.

15. The method in claim 11, wherein the size of said ensemble is fixed.

16. A non-transitory program storage device readable a computer tangibly embodying a program of instructions executable by said computer for performing a method of searching data in databases using an ensemble of models, said method comprising:

ordering models within said ensemble in order of prediction accuracy, with the most accurate model being first in said order, using a computer;

calculating confidence values of each of said sub-ensembles, using said computer;

selecting a sub-ensemble of said models that meets a given level of confidence, using said computer, wherein models are joined together in said sub-ensemble in said order of prediction accuracy, and wherein as the level of confidence is raised, a sub-ensemble that has more models will be selected in said selecting process, and as the level of confidence is lowered, a sub-ensemble that has fewer models will be selected in said selecting process; and applying said sub-ensemble, in place of said ensemble, to an example to make a prediction, using said computer.

17. The non-transitory program storage device in claim 16, wherein said sub-ensemble includes fewer models than said ensemble.

18. The non-transitory program storage device in claim 16, wherein said confidence is a measure of how closely results from said sub-ensemble will match results from said ensemble.

19. The non-transitory program storage device in claim 16, wherein the size of each sub-ensemble is different and has a potentially different level of confidence.

20. The non-transitory program storage device in claim 16, wherein the size of said ensemble is fixed.

* * * * *